United States Patent [19]

Morimoto et al.

[11] Patent Number: 4,856,941

[45] Date of Patent: Aug. 15, 1989

[54] HIGH DENSITY PNEUMATIC TRANSPORT METHOD FOR USE IN POWDER OR GRANULAR MATERIAL AND SYSTEM FOR PRACTICING THE METHOD

[75] Inventors: Kiyoshi Morimoto, Mishima; Akikazu Iwamoto, Shizuoka; Masuo Moriyama, Numazu; Atsuroh Sonoda, Hirakata, all of Japan

[73] Assignees: Kyowa Hakko Kogyo Co., Ltd., Tokyo; Kabushiki Kaisha Matsui Seisakusho, Osaka, both of Japan

[21] Appl. No.: 112,106

[22] Filed: Oct. 20, 1987

[30] Foreign Application Priority Data

Oct. 21, 1986 [JP] Japan .................. 61-251172

[51] Int. Cl.⁴ .................................. B65G 53/00
[52] U.S. Cl. .................................. 406/85; 406/49; 406/192
[58] Field of Search .................. 406/49, 50, 1, 19, 31, 406/37, 34, 83, 85, 191, 192, 195, 197, 184–190

[56] References Cited

U.S. PATENT DOCUMENTS 3,419,209  12/1968  Munn ........................... 406/49
4,106,817   8/1978  Tsuzuku et al. ............... 406/49

Primary Examiner—Joseph F. Peters, Jr.
Assistant Examiner—Edwin L. Swinehart
Attorney, Agent, or Firm—Koda and Androlia

[57] ABSTRACT

An improved method and the related system for pneumatically transporting a powder or granular material placed in an airtight storage container through a transport pipe in high density. In the invention, pressurized gas is being intermittently supplied to the airtight storage container containing the material therein so as to take out of the container and a transport plug is being synchronously fed into the base of the transport pipe, whereby the powder or granular material is successively formed into a long column inside the transport pipe and is pneumatically transported at very slow speed.

9 Claims, 5 Drawing Sheets

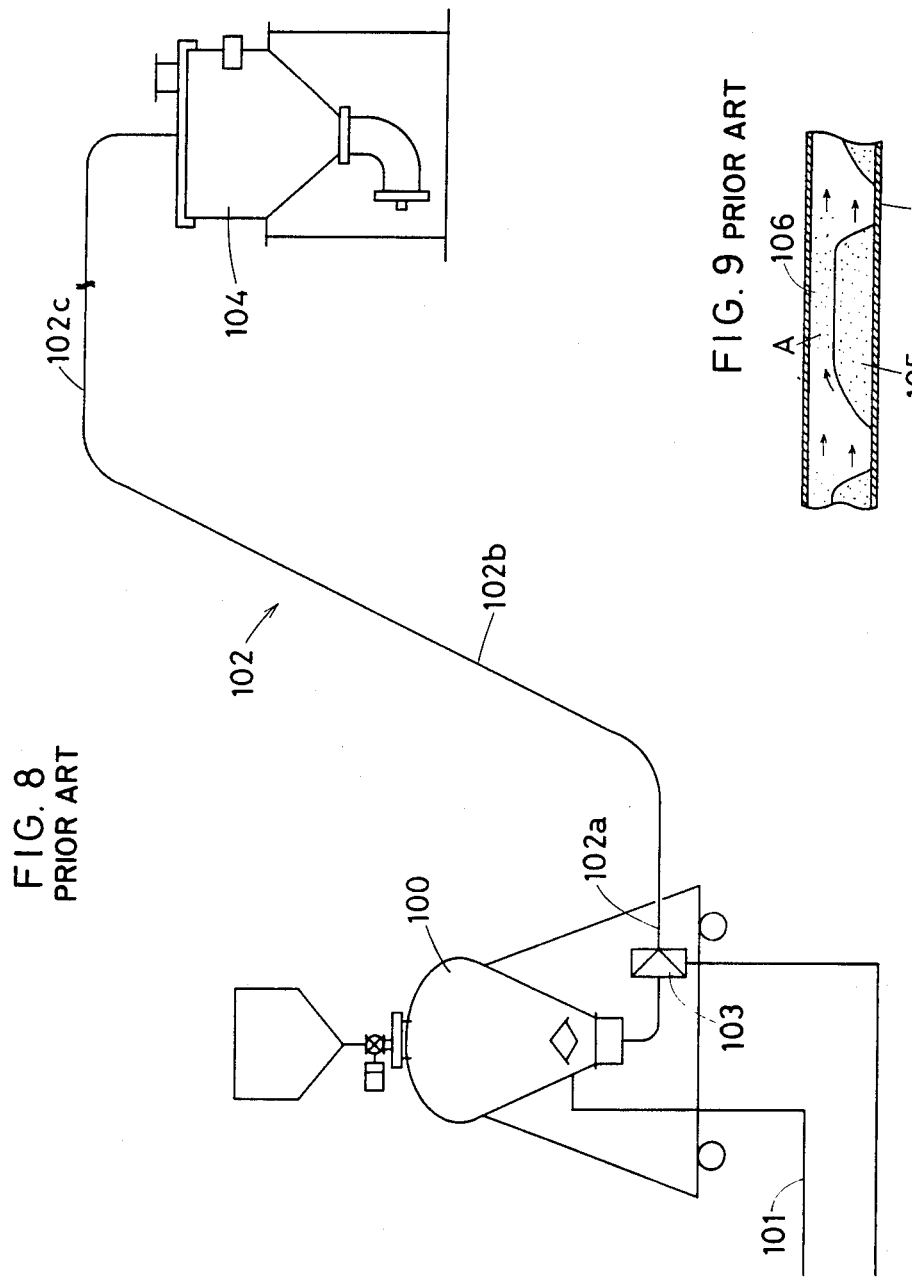

HIGH DENSITY PNEUMATIC TRANSPORT METHOD FOR USE IN POWDER OR GRANULAR MATERIAL AND SYSTEM FOR PRACTICING THE METHOD

BACKGROUND OF THE INVENTION

I. Field of the Invention

The present invention relates to an improved method and the related system for transporting a powder or granular material in high density, and more particularly to a method of pneumatically transporting a powder or granular material contained in an airtight storage container efficiently to a collector at very slow speed while forming the material into a long column inside a transport pipe by feeding transport plug in synchronism with the intermittent supply of the pressurized gas and to a system for practising the method.

II. Prior Art

FIG. 8 shows a powder or granular pneumatic transport system of a general type conventionally used. The system is of the construction in which a powder or granular material placed in an airtight storage container 100 is transferred from the container to a lower pipe 102a of a transport pipe 102 by the gas supplied from a gas feed pipe 101, and the material is formed into a plug shape by supplying pressurized gas from a pressure nozzle 103 disposed intermediately of the lower pipe 102a, and then the plug-shaped material is pneumatically transported inside an upper pipe 102c of the transport pipe 102 through an inclined pipe 102b and is finally received by a collector 104.

However, when the powder or granular material is pneumatically transported in the form of a plug by the system described above, clearance 106 is often formed above the plug-shaped material while it passes through the transport pipe 102 as shown in FIG. 9, with the result that the material A on the surface of the plug-shaped material 105 is first transferred and the plug shape is broken. Thus that eventually results in unsatisfactory transfer.

Moreover, since any of those conventional systems as described above transfers the plug-shaped material at an extremely fast speed like several meters per second for example, the material is obliged to incur strong shock when being received by collector 104, thus easily incurring severe damage or disintegration.

Furthermore, that causes another problem of mutual collision between the powder or granular materials inside the transport pipe 102.

Accordingly, when the method above mentioned is applied to transporting of medicine tablets which are demanded of high production quality, a production rate of defectives tends to increase.

SUMMARY OF THE INVENTION

Accordingly, a primary object of the invention is to provide an improved method capable of pneumatically transporting a powder or granular material in high density without imparting impulse to the material or causing segregation of the material.

Another object of the invention is to provide an improved system capable of pneumatically transporting a powder or granular material in high density efficiently without imparting impulse to the material or causing segregation thereof.

The above objects are achieved by the invention, and the invention is characterized in that it includes the following active steps. Namely, in the first step, pressurized gas is intermittently supplied into an airtight storage container so as to take the material out of the container. In the second step, a trans port plug is fed into the base end of the transport pipe immediately after having the material in the container took out into the transport pipe. As a result the material is sectioned by the transport plug and is formed into a long column and the material thus sectioned by means of transport plug is successively pneumatically transported to a collector at very slow speed. In the final step, the material is received into the collector in the state of substantially gravitational fall.

At the same time, the system proposed by the invention comprises an airtight storage container for containing a powder or granular material therein, a collector for receiving the material pneumatically transported, a transport pipe including a horizontal transport pipe portion and connecting the storage container to the collector, a gas supply means for intermittently supplying pressurized gas into the storage container, a transport plug adapted to be fed into the base end of the transport pipe in synchronism with the intermittent supply of the pressurized gas, a pipe with an enlarged outlet caliber, the pipe being connected to the initial end of the horizontal pipe portion, and a speed reduction means, disposed between the terminal end of the horizontal pipe portion and the collector, for reducing the speed of the material which has been transported in the form of a long column down to substantially gravitational fall.

The invention described above is suited for using in with capsules, powder, granules, and other solid substances in addition to compression moldings such as medicine tablets, candies, electrical or electronic parts.

Namely, the invention is suited for the materials which are greatly demanded of no cracks and no chips.

BRIEF DESCRIPTION OF THE DRAWINGS

Other objects and advantages of the invention will be apparent from the following description, the appending claims and the accompanying drawings, wherein:

FIG. 8 shows an embodiment of construction of a conventional system; and

FIG. 9 explains a plug formed of the powder or granular material in the conventional system.

DETAILED DESCRIPTION OF THE INVENTION

A description will now be given of one embodiment of the invention with reference to the drawings. The embodiment shown herein uses compression air and medicine tablets as a transport medium and a powder or granular material, respectively.

Figure 1:
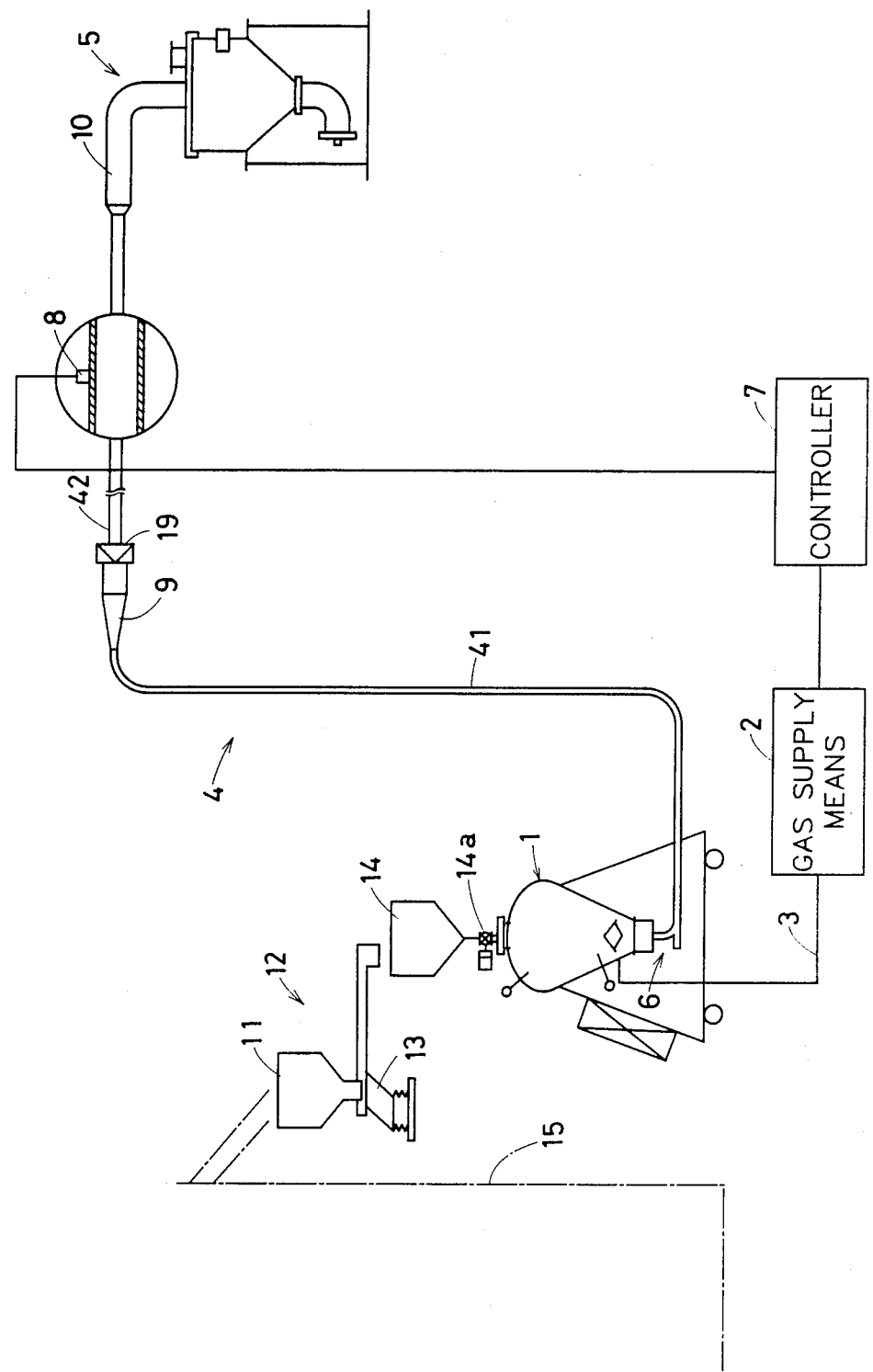
FIG. 1 is the schematic diagram of a preferred embodiment of the invention.

FIG. 1 is a schematic diagram of the system of the invention. The numeral 1 designates an airtight storage container. Tablets supplied from compression molding 15 are received in the container 1 through a feeder 12. The tablets thus received in the container 1 is transferred into a transport pipe 4 by means of compression air supplied intermittently to the container 1 via an air feed pipe 3 by a gas supply means 2. At this time, transport plug 16(17) as shown in FIGS. 4, 5 to 6b is synchronously fed into the base end of the pipe 4.

Figure 2:
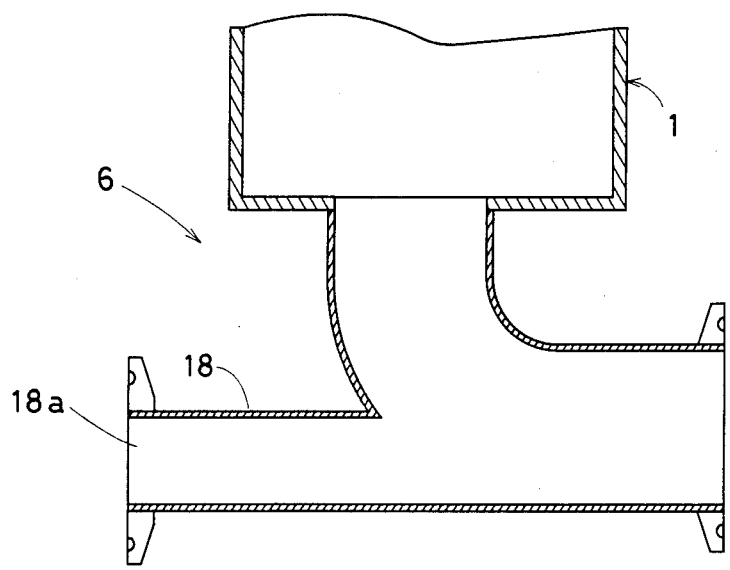
FIG. 2 is a sectional view illustrating the construction of a transport plug loading portion.

FIG. 2 shows the construction of a transport plug loading portion 6 formed at the base end of the pipe 4. The portion 6 has a loading opening 18a open at one end of a branch pipe 18 communicating with the pipe 4 extending from the container 1.

The portion 6 illustrated is shown as the one in which the plug is manually loaded. But the invention is not limited to the embodiment shown but may include of such construction as to permit automatic loading from a cassette containing a multiplicity of plugs therein in synchronism with the intermittent supply of pressurized gas.

Figure 3:
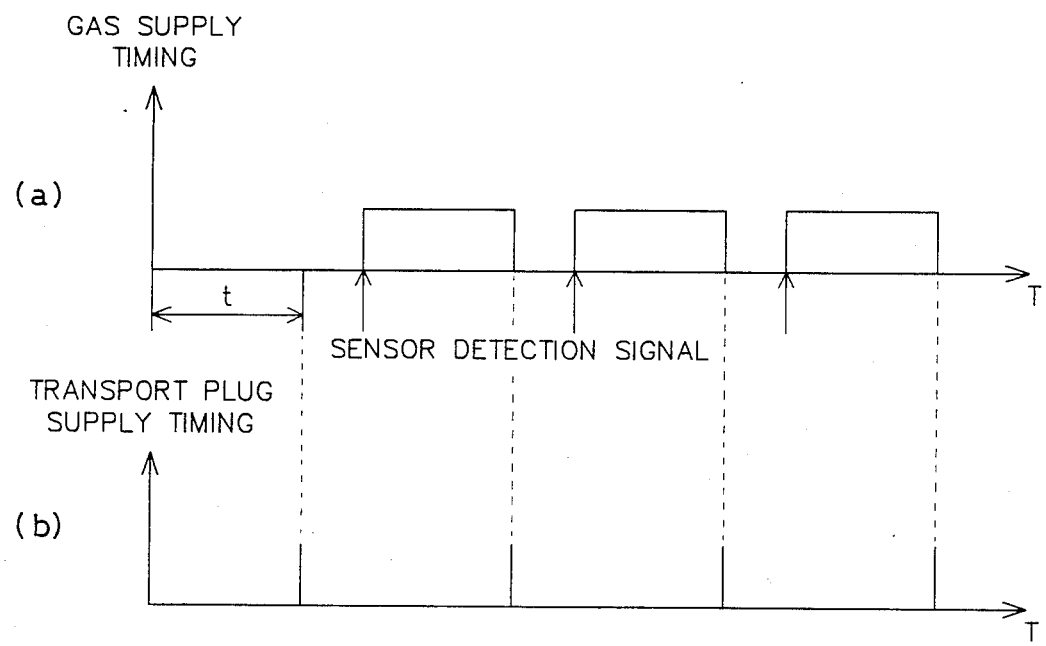
FIG. 3 (a),(b) are time charts explaining supply timing of transport gas and a transport plug, respectively.

FIG. 3 (a),(b) are time charts explaining supply timing of pressurized gas and a transport plug, respectively. The plug is fed at the end of every time intermittent supply of pressurized gas, and the next supply of air is carried out every time a sensor to be described later detects the plug disposed at suitable position in the pipe 4.

On the other hand, a feeder 12 is designed to feed tablets into the airtight storage container 1 by a magnetic vibrator 13 being driven to vibrate a hopper 11 containing tablets sent from a compression molding machine 15. The container 1 is provided with a hopper 14 and is adapted to contain tablets fed from a feeder 12 by controlling a valve 14a disposed below the bottom of the hopper 14. The amount of tablets stored in the container 1 is detected by a level switch and when the amount of tablets is reduced below the lower limit, the valve 14a is opened and at the same time the magnetic vibrator 13 is driven to start automatic feeding.

On the other hand, the transport pipe 4 comprises a riser portion 41 rising at a suitable gradient from the airtight storage container 1 and a horizontal pipe portion 42 extending from the riser portion 41. The pipe 4 is provided at the initial end of the pipe portion 42 with a pipe 9 with gradually enlarged outlet caliber and at the terminal end of the portion 42 with an elbow-shaped pipe 10 which has a larger caliber than that of pipe 42 and is connected to a collector 5. The pipe 9 and 10 constitute a speed reduction means, respectively.

For instance, the speed reduction means 10 may be provided in various constructions other than the elbow-shaped pipe of the type described, insofar as the means can reduce the speed of a material which has been transported by compression air. Accordingly, besides the above mentioned construction, such a pipe of simple construction as, for example, a perforated pipe may be employed.

The horizontal pipe 42 is provided at a suitable portion with a sensor 8 for detecting the passage of the transport plug. The sensor 8 sends a detection signal to a controller 7 when it detects the plug 16(17), and the controller 7, upon receipt of the signal, drives a gas supply means 2 to supply the next compression air to the storage container 1 (see FIG. 3).

The sensor 8 of the kind described may serve the purpose insofar as it can descriminate between the material to be transported and the transport plug. For example, a color sensor may be used. And the length of the transport pipe 4 may be left to users' discretion. In addition to the construction described above, for example, a pressure booster 19 is employed to compensate for reduced transport pressure in the pipe 4, when the pipe is long.

Next, an embodiment of the transport plug used in the invention will be described.

Figure 4:
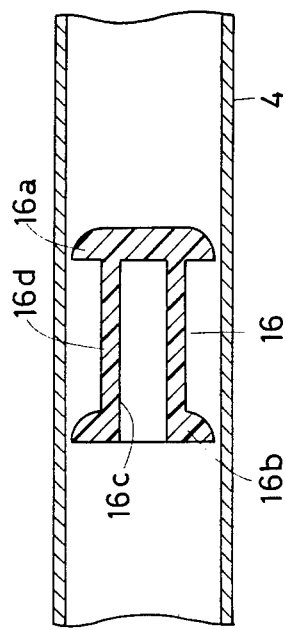
FIG. 4 shows an embodiment of the transport plug.

FIG. 4 shows an embodiment of the transport plug used in a transport pipe whose inlet and outlet caliber are substantially the same as those of a straight pipe (transport pipe). The plug 16 has spoollike shape with a flat mushroomlike front portion 16a and a rear portion 16b. The front portion 16a integrally connected with a rear portion 16b by a stem 16d. Formed in about the center of the rear portion 16b is a hollow hole 16c leading to the stem 16d.

The outer peripheral edge of the front portion 16a is substantially the same with that of the rear portion 16b and the transport plug 16 is formed of a soft material such as silicon rubber sized large enough to come in close contact with the inside surface of the transport pipe 4. The plug 16 is propelled along the inside of the pipe 4 by pressurized gas applied to the hollow hole 16c.

Figure 5A:
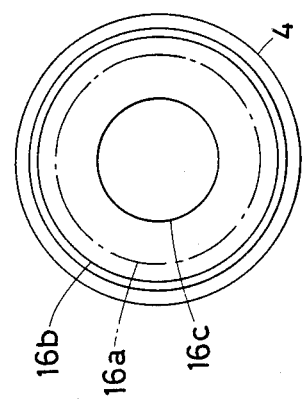
FIG. 5 and 5a show another embodiment of the transport plug.
Figure 5:
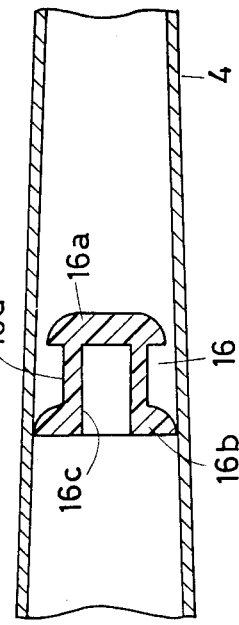

FIG. 5 shows another embodiment of the plug used in a pipe (transport pipe) different in its inlet and outlet caliber. The plug 16 shown is similar in shape to that shown in FIG. 4, but the rear portion 16b is larger in diameter than the front portion 16a, so that when the plug 16 passes through a smaller caliber portion of the pipe, both the front portion 16a and the rear portion 16b are deformed so as to bring their peripheral edges into close contact with the inside surface of the pipe 4. FIG. 5a shows the transport plug 16 as seen from the rear side thereof.

Figure 6:
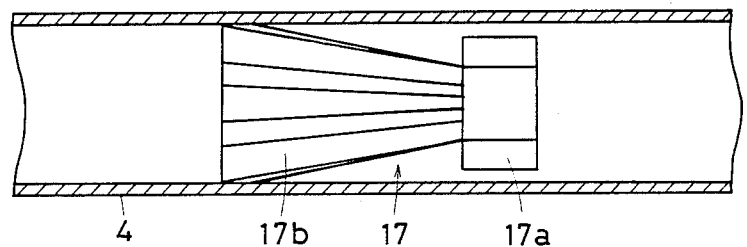
FIG. 6, 6a and 6b show a still another embodiment of the transport plug.
Figure 6A:
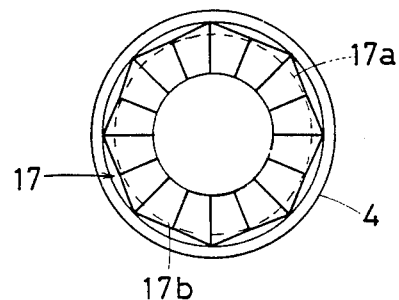
Figure 6B:
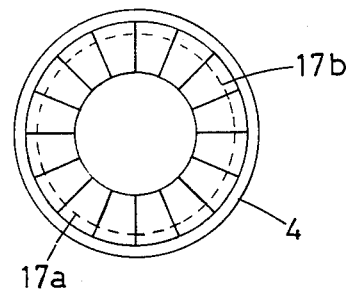

The transport plug 17 shown in FIG. 6 is formed like a shuttlecock of a badminton. The plug 1 has a plurality of rear feathers 17b made of a thin Teflon material and formed like a petal and has a flat top made of Teflon in the head portion 17a. When the plug receives gas pressure from behind the rear feathers 17b, the feathers 17b folded as shown in FIG. 6a are opened to come in close contact with the inside surface of the pipe 4 as shown in FIG. 6b and receive a propelling force.

Further, a description will be given of a transport method.

Compression air is supplied to the storage container 1 for a specified time by driving a gas supply means 2, and a transport plug 16(17) is fed into the base end of the pipe 4 almost simultaneously with the end of supply of compression air. The duration of compression air supplied at this time is set to the time during which a sufficient amount of powder or granular material is fed into the transport pipe 4 to form a suitable length of a column, and following supply of compression air is commenced when a detection signal from the sensor 8 disposed in a horizontal pipe portion 42 is detected.

Figure 7:
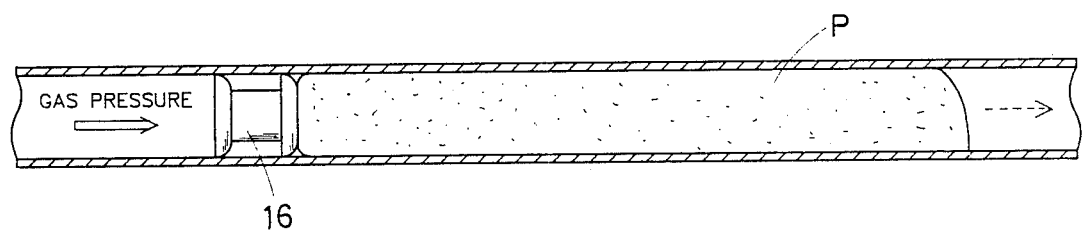
FIG. 7 explains a long column formed in the transport pipe.

In this manner, the powder or granular material is taken in suitable amounts out of the storage container 1, passes through a riser portion 41 of the transport pipe 4, rises and thereafter reaches a horizontal pipe portion 42, accompanied with the transport plug 16(17), whereupon the material is reduced in speed by means of a pipe 9 with a gradually enlarged outlet caliber disposed at the initial end of the horizontal pipe portion 42 and is about to block up the horizontal pipe portion 42. And then, the material is pushed by the transport plug 16(17)

and is forcedly moved forward through the horizontal pipe portion 42, with the result that the material is formed into a long column material P inside the pipe 42 as shown in FIG. 7. The material p thus formed into a long column is transported intact at very slow speed through the pipe 42 and is again reduced in speed by means of the speed reduction means 10 at the terminal end of the pipe 42 and finally falls into the collector 5 in the state of substantially gravitational fall.

The powder or granular material in the storage container 1 is successively sectioned by the plug 16(17) on the principle described above and is transported at very slow speed in the form of a long column until finally it is dropped into the collector 5 substantially gravitationally. Therefore, the material is not only free from impact but also free from segregation while being pneumatically transported.

According to the experiments having been conducted by the inventors, it showed that, in the case of a transport pipe five meters in length, a column about one meter long was formed and the speed of transport was as very slow as 0.1 m/sec.

It was also confirmed that there was no change in the speed of transport even in the case of a 20m transport pipe and that the length of a column was increased to about 5 meters.

As is clear from the above description, since the method of the invention makes it possible to transport a powder or granular material in high density, namely in the form of a long column, through the horizontal upper pipe 42 at very slow speed, there is no anxiety of giving an impact to the material or causing segregation while the material is pneumatically transported through the transport pipe 4.

Therefore, according to the invention, the problem of producing cracks and chips which is inherent in the conventional pneumatic transport, may be completely solved.

Accordingly, the method of the invention is suited for transporting tablets of medicine which are demanded of high quality during production and compression moldings of specified shape.

Consequently, it is not too much to say that the present invention securely provides industries with more substantial profit potentials in that the problem which is inherent in the conventional pneumatic methods has been completely solved.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

WHAT IS CLAIMED IS

1. A high density pneumatic transport method of pneumatically transporting a powder or granular material placed in an airtight storage container to a collector through a transport pipe by the use of pressurized gas, the method comprising the steps of:

supplying pressurized gas intermittently to the airtight storage container containing a powder or granular material therein so as to take the material out of the container and feed the same into the transport pipe;

feeding a hollow, elongated transport plug into a base end of the transport pipe in synchronism with the intermittent supply of the pressurized gas so as to section the material, whereby the material is successively formed into a long column in high density and pneumatically transported to the collector at very slow speed; and finally receiving the material which has been transported in the form of a long column into the collector in the state of substantially gravitational fall.

2. A high density pneumatic transport system for pneumatically transporting a powder or granular material placed in an airtight storage container to a collector through a transport pipe by the use of pressurized gas, the system comprising:

an airtight storage container containing a powder or granular material therein;

a collector adapted to receive the transported material;

a transport pipe including a horizontal pipe portion, the transport pipe connecting the collector to the airtight storage container;

a gas supply means for intermittently supplying pressurized gas to the airtight storage container;

a hollow, elongated transport plug adapted to be fed into a base end of the transport pipe in synchronism with the intermittent supply of the pressurized gas;

a pipe with a gradually enlarged outlet caliber, the pipe being disposed at the initial end of the horizontal pipe portion; and a speed reduction means, disposed between the terminal end of the horizontal pipe portion and the collector, for reducing the speed of the material which has been transported in the form of a long column down to substantially gravitational fall.

3. A high density pneumatic transport system according to claim 2 wherein the speed reduction means is an elbow-shaped pipe with a large caliber than that of the transport pipe.

4. A high density pneumatic transport system according to claim 2, wherein said transport plug is of a shuttle cock shape comprising a front portion and a plurality of rearward extending feather-like members.

5. A high density pneumatic transport system according to claim 2, wherein said transport plug is of a spool-like shape with a flat mushroom-like front portion.

6. A high density pneumatic transport system according to claim 5, wherein said front portion and a back portion of the spool-like shape are of substantially the same diameter.

7. A high density pneumatic transport system according to claim 5, wherein a back portion of said spool-like shape is of a diameter larger than a diameter of said front portion.

8. A high density pneumatic transport system according to claim 5, wherein said transport plug is made from silicon rubber.

9. A high density pneumatic transport system according to claim 4, wherein said transport plug is made of teflon.

* * * * *